Patented Feb. 16, 1932

1,845,286

UNITED STATES PATENT OFFICE

HARRY P. KIMBER AND FREDERICK MILLER, OF DETROIT, MICHIGAN, ASSIGNORS TO EARL HOLLEY, OF DETROIT, MICHIGAN

COATING FOR METAL MOLDS

No Drawing. Application filed December 13, 1926, Serial No. 154,646. Renewed June 23, 1931.

The object of this invention is to provide an improved protective coating for metal molds in which metal castings are made. The specific object of this coating is to eliminate the necessity for smoking the molds, which has been found most essential with the coatings now in use when casting gray iron in the molds, if chilled (white) spots are to be avoided.

We have discovered that a mixture of 'C' grade sodium silicate, castor oil, lampblack and salicylic acid with water will form a paste which, when applied to a heated metal mold, produce a relatively thick coating which is adherent, refractory, and a heat insulator which is not easily eroded by the action of molten metal.

The proportions we have found suitable for protecting cast iron molds from the action of molten cast iron are as follows:—

A mixture of—

A { 20 parts, by weight, of sodium silicate, 'C' grade.
25 parts of castor oil.

B { 5 parts of lampblack mixed with 5 parts of water.
5 parts of salicylic acid.

(The salicylic acid is added last for best results.) Mixture 'B' is added to mixture 'A'.

It must be understood that the sodium silicate is mixed in the liquid form as purchased, containing of course a considerable quantity of water. The ingredients are mixed as follows:—

The castor oil is first mixed with the dilute solution of 'C' grade sodium silicate. A mild chemical action takes place, resulting in an emulsion of saponified oil and silica gel. The castor oil is added until there is an excess, causing the complete decomposition of the sodium silicate. Finally a mixture of five parts of salicylic acid and five parts of lamp black are added to the castor oil-sodium silicate emulsion, and the whole mixture is heated to the boiling point of water and vigorously stirred to ensure a uniform mixture.

The paste or thick emulsion thus prepared is applied as follows:—

The mold is heated to at least 400° F. and the coating applied with a brush. As salicylic acid melts at slightly above 300° F., the effect of the heat of the mold on the coating is to make it much more fluid and therefore the application of the coating is facilitated, as the coating becomes thinner and spreads easily, covering a larger area with a tenacious coating. The mold is then heated so as to cause the decomposition of the organic compounds. If a thicker coating is desired the mold is allowed to cool to 500° F. and then recoated and reheated. In practice from three to seven coatings will give the desired thickness, such a coating being .005" to .010" thick.

In actual operation the coating is repaired every 10 or 20 castings. If this is done it is found the mold will stand up indefinitely and the coating will not peel off, which is the characteristic defect of existing coatings when an attempt is made to duplicate such a thickness.

As castor oil acts as a saponifiable oil, another saponifiable oil might be used instead of castor oil with similar results. For example linseed oil or lard oil.

As far as the salicylic acid is concerned, tartaric, benzoic, tannic acid or any other organic compound, preferably an acid, may be used, the important thing being that the substitute should melt at about 300° F., which facilitates the application of the coating as described above.

The ultimate structure is a very intimate mixture of very finely divided carbon and dehydrated silica gel. Upon burning out the carbon we find that this dehydrated silica gel has much the appearance of a honey comb when examined under the microscope.

What we claim is:—

1. A coating paste for metal molds, comprising an emulsion with a dilute solution of sodium silicate in water and castor oil mixed together with a small quantity of salicylic acid and lampblack mixed therein.

2. A coating for protecting iron molds, consisting of colloidal silica intimately mixed with very finely divided carbon deposited from a suspension in water, the silica being deposited from a mixture of sodium silicate solution and a saponifiable oil.

In testimony whereof we affix our signatures.

HARRY P. KIMBER.
FREDERICK MILLER.